(12) United States Patent
Zhong et al.

(10) Patent No.: US 12,298,557 B2
(45) Date of Patent: May 13, 2025

(54) HETEROGENEOUS RARE-EARTH DOPED SYSTEMS

(71) Applicant: THE UNIVERSITY OF CHICAGO, Chicago, IL (US)

(72) Inventors: Tian Zhong, Chicago, IL (US); Christina Wicker, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 358 days.

(21) Appl. No.: 17/635,088

(22) PCT Filed: Aug. 14, 2020

(86) PCT No.: PCT/US2020/046454
§ 371 (c)(1),
(2) Date: Feb. 14, 2022

(87) PCT Pub. No.: WO2021/030724
PCT Pub. Date: Feb. 18, 2021

(65) Prior Publication Data
US 2022/0291450 A1   Sep. 15, 2022

Related U.S. Application Data

(60) Provisional application No. 62/887,373, filed on Aug. 15, 2019.

(51) Int. Cl.
*G02B 6/12* (2006.01)
*C03C 3/095* (2006.01)
(Continued)

(52) U.S. Cl.
CPC ............ *G02B 6/1225* (2013.01); *C03C 3/095* (2013.01); *B82Y 20/00* (2013.01)

(58) Field of Classification Search
CPC ............................ G02B 6/1225; B82Y 20/00
See application file for complete search history.

(56) References Cited

U.S. PATENT DOCUMENTS

| 6,611,372 B1 | 8/2003 | Peyghambarian et al. |
| 7,606,455 B2 * | 10/2009 | Barrios ................ H01S 5/1071 385/132 |

(Continued)

OTHER PUBLICATIONS

Zhong et al., Emerging rare-earth doped material platforms for quantum nanophotonics, Nanophotonics, vol. 8, No. 11, 2019, pp. 2003-2015. https://doi.org/10.1515/nanoph-2019-0185 (Year: 2019).*

(Continued)

*Primary Examiner* — Peter Radkowski
(74) *Attorney, Agent, or Firm* — Barnes & Thornburg LLP

(57) ABSTRACT

Technologies for a strong rare-earth-ion interactions are disclosed. In the illustrative embodiment, a heterogeneous slot waveguide is formed with two layers of silicon surrounding a layer of Er:Y2O3, resulting in a waveguide that supports a TM mode with a strong confinement of electromagnetic field near the erbium dopants. The strong concentration of electromagnetic field and small mode volume allows for strong interactions between optical fields and the erbium dopants. In some embodiments, the slot waveguide structure may be configured as a microring resonator or a photonic crystal, resulting in small-mode-volume resonators with high Q-factors. In some embodiments, strong electro-optic and/or acousto-optic coupling may be achieved, resulting in quantum transducer able to coherently convert between signals in different systems.

19 Claims, 9 Drawing Sheets

(51) Int. Cl.
*G02B 6/122* (2006.01)
*B82Y 20/00* (2011.01)

(56) References Cited

U.S. PATENT DOCUMENTS

| | | | |
|---|---|---|---|
| 8,644,648 B2* | 2/2014 | Ho | G02F 1/0018 |
| | | | 385/2 |
| 9,256,086 B2* | 2/2016 | Ho | G02F 1/065 |
| 9,568,752 B2* | 2/2017 | Ho | G02F 1/065 |
| 10,018,888 B2* | 7/2018 | Thaniyavarn | G02F 1/2255 |
| 10,295,844 B2* | 5/2019 | Kissa | G02F 1/0316 |
| 10,310,181 B2* | 6/2019 | Wessels | G02F 1/035 |
| 10,782,590 B2* | 9/2020 | Witmer | G02F 1/017 |
| 2003/0147620 A1 | 8/2003 | Anderson et al. | |
| 2007/0114628 A1* | 5/2007 | Barrios | H01S 3/0632 |
| | | | 257/432 |
| 2010/0098424 A1* | 4/2010 | Ho | G02F 1/065 |
| | | | 398/116 |
| 2014/0205229 A1* | 7/2014 | Thaniyavarn | G02F 1/225 |
| | | | 385/3 |
| 2014/0307995 A1* | 10/2014 | Ho | G02F 1/065 |
| | | | 385/2 |
| 2014/0354109 A1 | 12/2014 | Grannen et al. | |
| 2015/0229100 A1 | 8/2015 | Sztein et al. | |
| 2016/0170244 A1* | 6/2016 | Ho | G02F 1/0018 |
| | | | 385/2 |
| 2016/0291352 A1* | 10/2016 | Kissa | G02F 1/0316 |
| 2017/0299811 A1* | 10/2017 | Wessels | G02B 6/1225 |
| 2018/0113373 A1* | 4/2018 | Witmer | G02F 1/017 |
| 2019/0137688 A1* | 5/2019 | Lin | G02B 6/1228 |
| 2019/0214789 A1* | 7/2019 | Santis | H01S 5/34306 |

OTHER PUBLICATIONS

Scarafagio et al., Ultrathin Eu- and Er-Doped $Y_2O_3$ Films with Optimized Optical Properties for Quantum Technologies, The Journal of Physical Chemistry C 2019 123 (21), 13354-13364, DOI: 10.1021/acs.jpcc.9b02597 (Year: 2019).*

Pélisset et al., Modal properties of a strip-loaded horizontal slot waveguide. J. Eur. Opt. Soc.-Rapid Publ. 13, 37 (2017). https://doi.org/10.1186/s41476-017-0065-5 (Year: 2017).*

Zhong, M., Hedges, M., Ahlefeldt, R et al. Optically addressable nuclear spins in a solid with a six-hour coherence time. Nature 517, 177-180 (2015). https://doi.org/10.1038/nature14025 (Year: 2015).*

Evan Miyazono, Ioana Craiciu, Amir Arbabi, Tian Zhong, and Andrei Faraon, "Coupling erbium dopants in yttrium orthosilicate to silicon photonic resonators and waveguides," Opt. Express 25, 2863-2871 (2017) (Year: 2017).*

PCT Search Report and Written Opinion prepared for PCT Application No. PCT/US2020/046454, completed Oct. 16, 2020.

* cited by examiner

# HETEROGENEOUS RARE-EARTH DOPED SYSTEMS

CROSS-REFERENCE TO RELATED APPLICATIONS

The present application is a national stage entry under 35 U.S.C. § 371 (b) of PCT International Application No. PCT/US2020/046454, filed Aug. 14, 2020, which claims the benefit of U.S. Provisional Patent Application No. 62/887,373, filed on Aug. 15, 2019, the entirety of which applications are incorporated herein by reference.

GOVERNMENT LICENSE RIGHTS

This invention was made with government support under grant number 1843044 awarded by the National Science Foundation. The government has certain rights in the invention.

BACKGROUND

Quantum information processing promises advances in communication and computing, as well as an improved understanding of fundamental physics. One useful resource for quantum information processing would be a system that simultaneously possesses long coherence times and narrow optical transitions, while allowing for chip-scale integration with photonics. Atom-like solid-state emitters such as semiconductor quantum dots and color centers in diamond have useful properties, but influences from their host matrices still impose significant limitations on their coherence properties.

Rare-earth (RE) ions such as erbium in solids feature numerous 4$f$-intra-shell transitions that are effectively shielded from their crystalline surroundings by closed outer shells, allowing for long spin coherence times (up to 6 hours) and narrow optical transitions (<100 Hz). Recent ensemble experiments have established the rare-earth doped crystals as the leading materials for optical quantum memories. However, the development of large-scale quantum devices based on rare-earth doped materials has remained a challenge

SUMMARY

According to one aspect of the disclosure, a heterogeneous waveguide comprises a first layer of high index dielectric material deposited on top of a substrate; a second layer of low index dielectric material deposited on top of the first layer, wherein at least part of the second layer is doped with a rare earth dopant; a third layer of high index dielectric material deposited on top of the second layer, wherein an index of refraction of the first layer and the third layer is higher than an index of refraction of the second layer.

In some embodiments, the second layer is an epitaxial layer.

In some embodiments, each of the first, second, and third layer is an epitaxial layer.

In some embodiments, the substrate is silicon oxide.

In some embodiments, the concentration of the dopant is 0.1 to 100 parts per million.

In some embodiments, the second layer is a rare earth oxide.

In some embodiments, the second layer is yttrium oxide.

In some embodiments, the second layer is yttrium orthosilicate.

In some embodiments, the first layer is silicon.

In some embodiments, the third layer is silicon.

In some embodiments, the rare earth dopant is erbium.

In some embodiments, the rare earth dopant is erbium, wherein the first layer is silicon, wherein the second layer is a rare earth oxide, wherein the third layer is silicon, wherein the dopant concentration is 0.1 to 100 parts per million.

In some embodiments, the rare earth dopant is erbium, wherein the first layer is silicon, wherein the second layer is a rare earth doped oxide, wherein the third layer is silicon, wherein the dopant concentration is 1-10 percent.

In some embodiments, the thickness of the second layer is between 5 nanometers and 1500 nanometers.

In some embodiments, the thickness of the second layer is between 10 nanometers and 750 nanometers.

In some embodiments, the thickness of the second layer is between 10 nanometers and 100 nanometers.

In some embodiments, the heterogeneous waveguide is a heterogeneous slot waveguide.

In some embodiments, the heterogeneous waveguide supports at least one spatial mode for at least one wavelength between 1,450 and 1,600 nanometers.

In some embodiments, the heterogeneous waveguide supports exactly one transverse magnetic spatial mode at the least one wavelength between 1,450 and 1,600 nanometers.

In some embodiments, the second layer is composed of (i) a first sublayer deposited on top of the first layer and being intentionally undoped, (ii) a second sublayer deposited on top of the first sublayer and having a desired doping concentration, and (iii) a third sublayer deposited on top of the second sublayer and being intentionally undoped.

In some embodiments, the second layer is composed of (i) a first sublayer deposited on top of the first layer and with a doping concentration of the rare earth dopant less than 0.1 parts per million, (ii) a second sublayer deposited on top of the first sublayer and with a desired doping concentration of the rare earth dopant between 1 and 100 parts per million, and (iii) a third sublayer deposited on top of the second sublayer and with a doping concentration of the rare earth dopant less than 0.1 parts per million.

In some embodiments, the heterogeneous waveguide comprises a first end and a second end, wherein each of the first end and the second end are tapered.

In some embodiments, the heterogeneous waveguide comprises a first end and a second end, wherein the first end is tapered and the second end is not tapered.

In some embodiments, the waveguide is at least one centimeter long.

In some embodiments, the heterogeneous waveguide is configured in a ring.

In some embodiments, the ring has an outer diameter less than 100 micrometers, wherein the heterogeneous waveguide configured in a ring establishes a resonator with a Q-factor for at least one mode in the resonator of at least $10^6$.

In some embodiments, the heterogeneous waveguide is configured in a microdisk.

In some embodiments, the microdisk has an outer diameter less than 100 micrometers, wherein the heterogeneous waveguide configured in the microdisk establishes a resonator with a Q-factor for at least one whispering-gallery mode in the resonator of at least $10^5$.

In some embodiments, the edges of the microdisk are suspended.

In some embodiments, the microdisk is coupled to a suspended waveguide.

In some embodiments, the heterogeneous waveguide has a plurality of holes extending in a transverse direction through the first, second and third layers, wherein the plurality of holes establish a photonic crystal cavity in the heterogeneous waveguide supporting at least one mode at least one wavelength $\lambda$, wherein the effective mode volume of the mode supported in the photonic crystal cavity is less than $0.1(\lambda/n)^3$, where n is an index of refraction of the second layer.

In some embodiments, the portion of the heterogeneous waveguide that defines the photonic crystal cavity is suspended from the substrate.

In some embodiments, the effective mode volume of the mode supported in the photonic crystal cavity is less than $0.1(\lambda/n)^3$.

In some embodiments, the at least one mode supported in the photonic crystal cavity has a Q-factor of at least $10^5$.

In some embodiments, the heterogeneous waveguide may further include a slot waveguide formed by the first, second, and third layers; a first proximity electrode disposed on a first side of the slot waveguide; and a second proximity electrode disposed on a second side of the heterogeneous waveguide opposite the first.

In some embodiments, the heterogeneous waveguide may further include an external magnet configured to apply a magnetic field in the range of zero to one tesla to the photonic crystal cavity.

In some embodiments, the heterogeneous waveguide may further include a slot waveguide formed by the first, second, and third layers; a first proximity electrode disposed on a first side of the heterogeneous waveguide; and a second proximity electrode disposed on a second side of the heterogeneous waveguide opposite the first.

In some embodiments, the heterogeneous waveguide may further include electronic circuitry to apply a DC voltage across the first proximity electrode and the second proximity electrode to apply an electric field for modulation of emission wavelength of the rare earth dopant.

In some embodiments, the heterogeneous waveguide may further include a first laser coupled to the heterogeneous waveguide, the first laser configured to perform spectral hole burning to isolate a spectral section of an inhomogeneous spectral width of the rare earth dopants doped in the second layer, wherein the isolated spectral section has a bandwidth of less than 200 kilohertz; and a second laser coupled to the heterogeneous waveguide, the second laser configured to probe a shift in an optically-excited energy level due to the application of the DC voltage.

In some embodiments, the heterogeneous waveguide may further include electronic circuitry to apply a radio frequency AC voltage across the first proximity electrode and the second proximity electrode to apply an electric field for causing splitting of a transition energy of the rare earth dopant.

In some embodiments, the heterogeneous waveguide may further include a first laser coupled to the heterogeneous waveguide, the first laser configured to perform spectral hole burning to isolate a spectral section of an inhomogeneous spectral width of the rare earth dopants doped in the second layer, wherein the isolated spectral section has a bandwidth of less than 200 kilohertz; and a second laser coupled to the heterogeneous waveguide, the second laser configured to probe a shift in an optically-excited energy level due to the application of the AC voltage.

In some embodiments, the heterogeneous waveguide may further include a superconducting microwave resonator that comprises the first proximity electrode and the second proximity electrode, wherein to apply the radio frequency AC voltage comprises to excite the superconducting microwave resonator.

According to one aspect of the disclosure, a quantum transducer comprises a heterogeneous waveguide, further comprising a superconducting microwave resonator that comprises the first proximity electrode and the second proximity electrode, the superconducting microwave resonator further comprising one or more Josephson junctions configured to support a transmon qubit; electronic circuitry to control a state of the transmon qubit; a laser coupled to the heterogeneous waveguide, the laser configured to transfer the state of the transmon qubit to a state of the rare earth dopants doped in the second layer through upconversion.

In some embodiments, the heterogeneous waveguide extends from a first position to a second position, wherein the heterogeneous waveguide is supported by the substrate at the first position and at the second position, wherein the heterogeneous waveguide is not supported by the substrate between the first position and the second position.

In some embodiments, the first position is at least 50 micrometers from the second position.

In some embodiments, the first position is less than 50 micrometers from the second position.

In some embodiments, the heterogeneous waveguide has a tapered end that is suspended.

In some embodiments, the heterogeneous waveguide may further include a first laser at a first frequency coupled to the heterogeneous waveguide; and a second laser at a second frequency coupled to the heterogeneous waveguide, the second frequency shifted an amount relative to the first frequency to support stimulated Brillouin scattering.

In some embodiments, the heterogeneous waveguide may further include an external magnet to apply a magnetic field to the heterogeneous waveguide to tune a Zeeman spin transition of the rare earth dopants doped in the second layer to be resonant with a frequency of the Brillouin scattering; and a third laser configured to probe energy levels of the Zeeman spin transition.

In some embodiments, the heterogeneous waveguide may further include a laser coupled to the slot waveguide, wherein the last has a frequency configured to couple a state of a phonon of the heterogeneous waveguide to an optically-excited state of a dopant of the heterogeneous waveguide.

According to one aspect of the disclosure, a method of creating a heterogeneous waveguide comprises forming, on a silicon oxide substrate, a first epitaxial layer of silicon; forming, on the first epitaxial layer of silicon, a second epitaxial layer of a rare earth oxide, wherein the second epitaxial layer is doped with a rare earth dopant; forming, on the second epitaxial layer of rare earth oxide, a third epitaxial layer of silicon; applying a mask defining a width of a waveguide to the third epitaxial layer of silicon; removing an area of the third epitaxial layer of silicon that is not under the mask while not removing an area of the third epitaxial layer of silicon that is under the mask; removing an area of the second epitaxial layer of rare earth oxide that is not under the mask while not removing an area of the second epitaxial layer of rare earth oxide that is under the mask; removing an area of the first epitaxial layer of silicon that is not under the mask while not removing an area of the first epitaxial layer of silicon that is under the mask, wherein the removal of the areas of the first, second, and third epitaxial layers not under the mask results in a slot waveguide established by the areas of the first, second, and third epitaxial layers under the mask; removing the mask.

In some embodiments, the first epitaxial layer of silicon is formed using molecular beam epitaxy.

In some embodiments, the second epitaxial layer of rare earth oxide is formed using molecular beam epitaxy.

In some embodiments, the third epitaxial layer of silicon is formed using molecular beam epitaxy.

In some embodiments, the area of the third epitaxial layer of silicon that is not under the mask is removed with use of inductively coupled plasma reactive ion etching using a first ion species.

In some embodiments, the area of the third epitaxial layer of silicon that is not under the mask is removed with use of inductively coupled plasma reactive ion etching using a second ion species different from the first ion species.

In some embodiments, the area of the first epitaxial layer of silicon that is not under the mask is removed with use of inductively coupled plasma reactive ion etching using the first ion species.

In some embodiments, the rare earth oxide is yttrium oxide.

In some embodiments, the first ion species is sulfur hexafluoride.

In some embodiments, the first ion species is chlorine.

In some embodiments, the second ion species is argon.

In some embodiments, each of the first and second proximity electrodes is gold.

In some embodiments, creating, on the first epitaxial layer of silicon, the second epitaxial layer of the rare earth oxide using molecular beam epitaxy comprises creating, on the first epitaxial layer of silicon, a first sublayer with a doping concentration of the rare earth dopant less than 0.1 parts per million; creating, on the first sublayer, a second sublayer with a doping concentration of the rare earth dopant between 1 and 100 parts per million; and creating, on the second sublayer, a third sublayer with a doping concentration of the rare earth dopant less than 0.1 parts per million.

In some embodiments, creating, on the first epitaxial layer of silicon, the second epitaxial layer of the rare earth oxide comprises forming, on the first epitaxial layer of silicon, a first sublayer of rare earth oxide without intentionally doping with rare earth dopant; forming, on the first sublayer, a second sublayer of rare earth oxide and doping with a desired concentration of rare earth dopant; and creating, on the second sublayer, a third sublayer without intentionally doping with rare earth dopant.

In some embodiments, the method may further include lithographically patterning a first proximity electrode on a first side of the slot waveguide and a second proximity electrode on a second side of the slot waveguide opposite the first.

According to one aspect of the disclosure, a method of creating a heterogeneous waveguide comprises forming, on a substrate, a first layer of high index dielectric material; forming, on the first layer of high index dielectric material, a second layer of a rare earth oxide, wherein the second layer is doped with a rare earth dopant; forming, on the second layer of rare earth oxide, a third layer of high index dielectric material; applying a mask defining a width of a waveguide to the third layer; removing an area of the third layer that is not under the mask while not removing an area of the third layer that is under the mask; removing an area of the second layer that is not under the mask while not removing an area of the second layer that is under the mask; removing an area of the first layer that is not under the mask while not removing an area of the first layer that is under the mask, wherein the removal of the areas of the first, second, and third layers not under the mask results in a slot waveguide established by the areas of the first, second, and third layers under the mask; and removing the mask.

BRIEF DESCRIPTION OF THE DRAWINGS

The detailed description particularly refers to the following figures, in which.

DETAILED DESCRIPTION OF THE DRAWINGS

Figure 1:
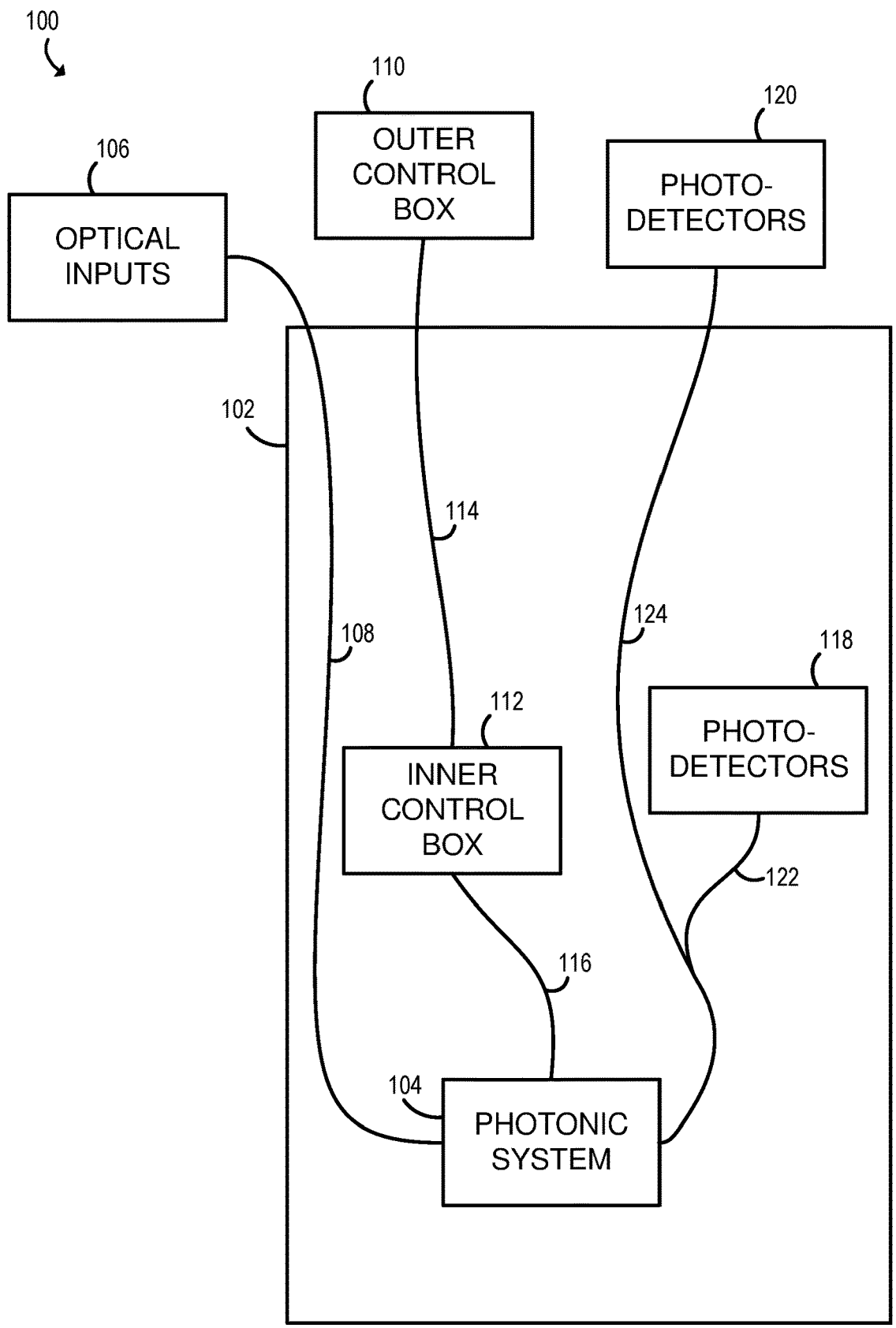
FIG. 1 is a simplified block diagram of an embodiment of a system for operating a heterogeneous rare-earth doped device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 8:
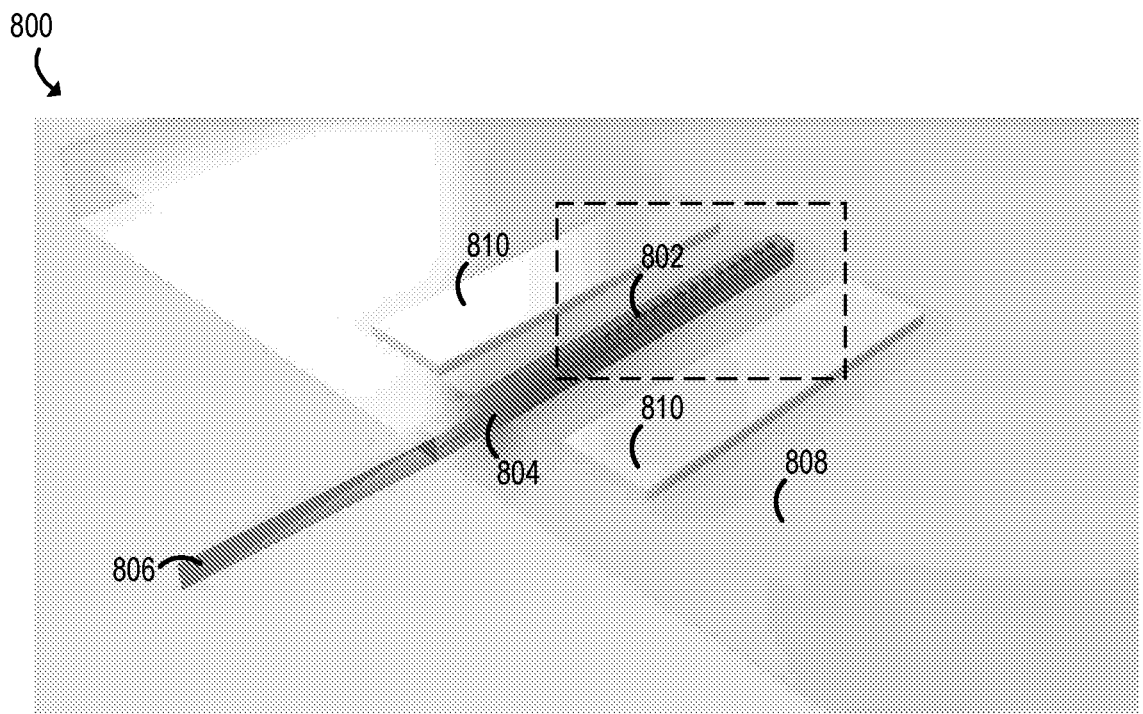
FIG. 8 is a perspective view of a photonic crystal heterogeneous waveguide of one embodiment of the system of FIG. 1.
Figure 9:
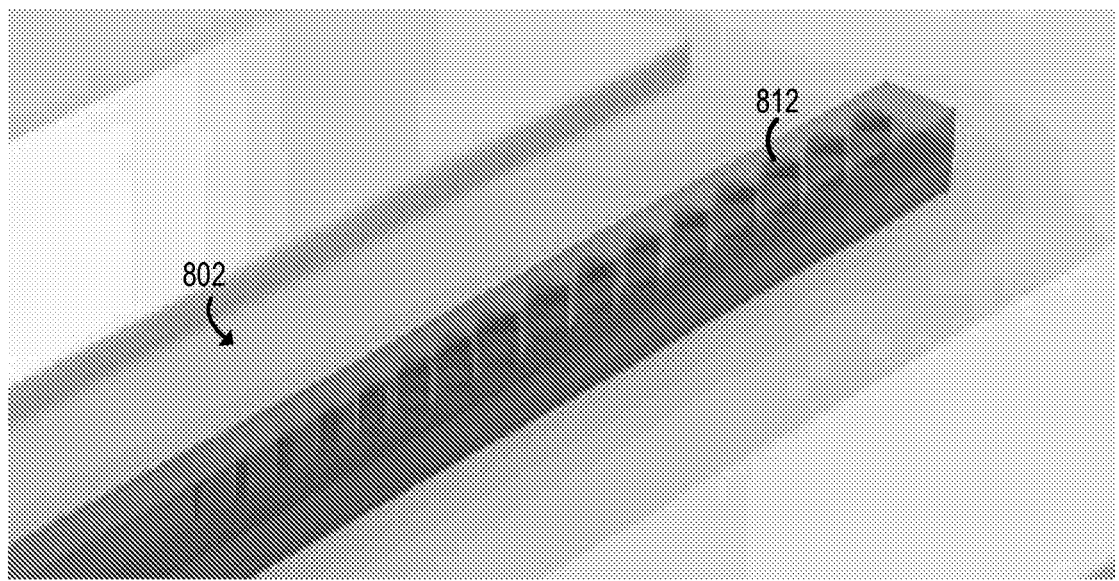
FIG. 9 is a zoomed-in view of the photonic crystal heterogeneous waveguide of FIG. 8.

Referring now to FIG. 1, a system 100 for operating a heterogeneous rare-earth doped device includes a refrigerator 102, which has a photonic system 104 positioned inside of it. The photonic system 104 may be embodied as, e.g., a heterogeneous waveguide system 200, a microring resonator system 600, or a photonic crystal heterogeneous waveguide system 800, as described in more detail below in regard to FIGS. 2, 6, and 8, respectively. The photonic system 106 may have optical inputs 106 coupled to it, such as lasers, LEDs, single photons, etc. In some embodiments, the optical inputs 106 may include more than one optical signal at a time, such as two lasers at different frequencies, one laser and a single photon or other quantum state, etc. The optical inputs 106 may be coupled to the photonic system 104 through an optical connector 108, such as one or more optical fibers.

The photonic system 104 may, in some embodiments, be electronically controlled by an outer control box 110, which may send, receive, amplify, filter, attenuate and otherwise control various signals to and from an inner control box 112 through one or more electrical connectors 114, such as one or more coaxial cables. The inner control box 112 may send, receive, amplify, filter, attenuate and otherwise control various signals to and from the outer control box 110 and the photonic system 116 through one or more electrical connectors 114, 116, such as one or more coaxial cables. In some embodiments, the photonic system 104 may include a magnet such as a superconducting magnet that can apply a controllable magnetic field, which may shift energy levels of the photonic system 104, such as through the Zeeman effect. The magnet may apply a magnetic field of any suitable strength, such as in the range of zero to one tesla or higher than one tesla.

The photonic system 104 may also be connected to photodetectors 118 inside the refrigerator 102 and/or photodetectors 120 outside the refrigerator 102. In the illustrative embodiment, the photodetectors 118 inside the refrigerator 102 may be superconducting nanowire single photon detectors (SNSPDs). Additionally or alternatively, in some embodiments, the photodetectors 118 and/or 120 may be any other kind of photodetectors, such as photodiodes, avalanche photodiodes, homodyne detectors, heterodyne detectors, etc. The photonic system 104 may be connected to the photodetectors 118, 120 through one or more optical connectors 122, 124, such as fiber optic cables. Each of the photodetectors 118, 120 may be connected to other equipment or electronics, such as the control boxes 110, 112 through one or more electrical connectors, such as coaxial cables (not shown).

The illustrative refrigerator 100 is a dilution refrigerator capable of chilling a sample to a temperature of approximately 10 millikelvin (mK). In other embodiments, the refrigerator 12 may be any other suitable type of refrigerator, such as a magnetic refrigerator, and may be capable of cooling down a sample such as some or all of the photonic system 104 to a different temperature, such as 77 Kelvin, 4 Kelvin, 1 Kelvin, or 100 mK. The illustrative inner control box 112 is inside the refrigerator 100, cooled down to a low temperature such as 1 Kelvin. It should be appreciated that, in some embodiments, the system 100 may include more than one inner control box 112 or various other electrical elements not shown, which may be at various temperatures such as 4 Kelvin, 1 Kelvin, 100 mK, or 20 mK. The illustrative outer control box 110 is outside the refrigerator 102 and is at room temperature. It should be appreciated that the system 100 may include additional optical and/or electronic equipment in some embodiments, such as logic electronics, wave-shaping electronics, opto-electronics, optical modulators, etc.

Figure 2:
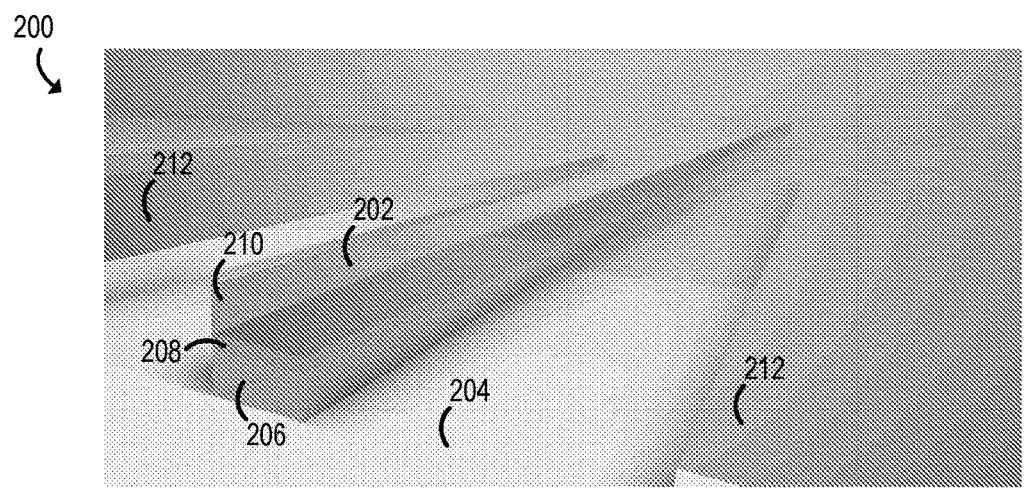
FIG. 2 is a perspective view of a heterogeneous waveguide of one embodiment of the system of FIG. 1.

Referring now to FIG. 2, a heterogeneous waveguide system 200 includes a heterogeneous waveguide 202. The illustrated heterogeneous waveguide 202 is supported by a substrate 204, such as silicon dioxide. The heterogeneous waveguide 202 includes a first high index dielectric layer 206 disposed on the substrate 204, a low index dielectric layer 208 disposed on the first high index dielectric layer 206, and a second high index dielectric layer 210 disposed on the low index dielectric layer 208. The low index dielectric layer 208 comprises rare-earth dopants. The low index dielectric layer 208 could be doped uniformly or non-uniformly as will be described below. It should be appreciated that, in the illustrated embodiment, the low index dielectric layer 208 sandwiched between the adjacent two high index dielectric layers 206, 210 forms a slot waveguide. When light is polarized in the transverse magnetic mode optical intensity is enhanced in the slot (layer 208) due to the dielectric discontinuity. The strong concentration of electromagnetic field and small mode volume allows for strong interactions between optical fields and the rare-earth dopants.

In the illustrated embodiment, the first high index dielectric layer 206 and the second high index dielectric layer 208 are silicon. The illustrative low index dielectric layer 208 is yttrium oxide ($Y_2O_3$) and the rare earth dopant is erbium. It is contemplated that the high index dielectric could be other than silicon, for example, aluminum nitride, gallium arsenide and the like. It is contemplated that the low index dielectric layer could be other than yttrium oxide, for example, yttrium orthosilicate and the like. It is further contemplated that the rare earth dopant could comprise one or more rare earth elements such as lanthanum, scandium or yttrium, instead of or in addition to, erbium. As used herein, a rare earth element or dopant refers to a lanthanide element, scandium or yttrium. In general, the doping concentration depends on the specific host material and rare earth dopant comprised in the low index dielectric layer 208 as well as the particular application for the system 200 as will be described below. The doping concentration (as measured by the amount of target atoms such as yttrium that are replaced by the dopant) may be any suitable level, such as 0.1 to 100 parts per million (ppm).

The dimensions of the heterogeneous waveguide 202 may be any suitable dimensions to support a desired electromagnetic wave. In the illustrative embodiment, the heterogeneous waveguide 202 may support one or more modes at least one wavelength in the range 1,450-1,600 nanometers. For example, in the illustrative embodiment, the width of the waveguide 202 may be 450 nanometers, and the total height of the three layers 206, 208, 210 may be 490 nanometers. The height of the illustrative low index dielectric layer 208 is 50 nanometers, and the height of each of the high index dielectric layers 206, 210 is 220 nanometers. In other embodiments, each layer may be any suitable height, such as anywhere from 5 to 3,000 nanometers. It should be appreciated that, in some embodiments, the heterogeneous waveguide 202 may be embodied as a slab waveguide, with a width significantly larger than the height.

In the illustrative embodiment, the dopant is erbium. The illustrative target optical transition is from $^4I_{15/2}$ to $^4I_{13/2}$ for erbium at the $C_2$ site of $Y_2O_3$, which as a wavelength of about 1535 nanometers and a lifetime of about 8.5 ms. The length of the heterogeneous waveguide can be relatively long, such as 2.5 centimeter, leading to a high optical depth of about 1 for the target transition at a doping of 50 ppm. The high optical depth will allow for precise spectroscopic measurements of the transition.

The illustrative heterogeneous waveguide system 200 includes an electrode 212 on either side of the waveguide 202. The electrode 212 is a proximity electrode that is proximate without contacting the waveguide 202. In the illustrative embodiment, each electrode 212 is gold. Additionally or alternatively, each electrode 212 may be another metal, such as aluminum or copper. Each electrode 212 is spaced, for e.g., by a distance of 1-20 micrometers from the waveguide 202. In the illustrative embodiments, each electrode 212 is 5 micrometers from the waveguide 202. It should be appreciated that, as a direct current (DC) or alternating current (AC) voltage is applied across the electrodes 212, the rare earth dopants in the waveguide 202 will be exposed to a DC or AC electric field, potentially shifting the energy levels of transitions of the dopants, as discussed in more detail below.

Figure 3:
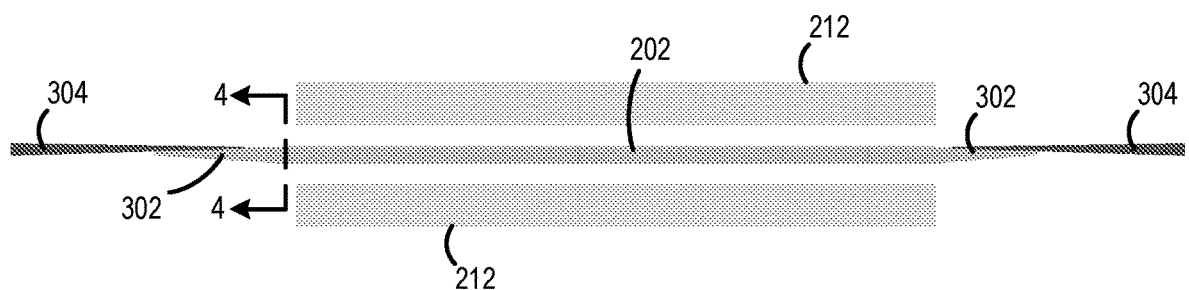
FIG. 3 is a top-down view of the heterogeneous waveguide of FIG. 2.

Referring now to FIG. 3, a top view of the heterogeneous waveguide system 200 shows the waveguide 202 and electrodes 212. In the embodiment illustrated in FIG. 3, each end of the heterogeneous waveguide 202 is a tapered end 302, which may be coupled to one or more tapered fibers 304. It should be appreciated that the tapered ends 302 and the tapered fibers 304 may allow for low-loss coupling between the waveguide 200 and the fibers that have the tapered ends 304. It is contemplated that only one, or none, of the ends 302 is a tapered end. For example, in some embodiments, the waveguide 202 may be coupled to a lensed fiber.

Figure 4:
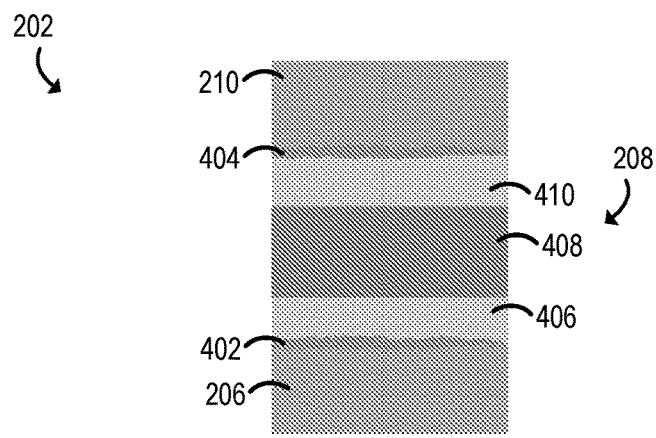
FIG. 4 is a cross-sectional view of the heterogeneous waveguide of FIG. 3.

Referring now to FIG. 4, a cross-section of the waveguide 202 according to some embodiments shows the high index dielectric layers 206, 210 with the low index dielectric layer 208 having rare-earth dopants sandwiched therebetween. In the illustrated embodiment, the layer 208 is not uniformly doped. More specifically, the low index dielectric layer 208 in the illustrated embodiment is delta-doped. In some embodiments, at the interface with each high index dielectric layer 206, 210, the low index dielectric layer 208 has a strained layer 402, 404, which may have a relatively high amount of strain and/or crystal defects. In order to reduce the impact of the strained layers 402, 404 on the optical properties of the dopants, the low index dielectric layer 208 may be subdivided into a first undoped region 406, a doped region 408, and an undoped region 410. In the illustrated embodiment, the doping concentration of the layer 208 is controlled with a delta doping technique by switching on and off the dopant source as the low index dielectric layer 208 is being grown by MBE. The undoped regions 410 may have any suitable thickness, such as 5-1,500 nanometers.

Figure 5:
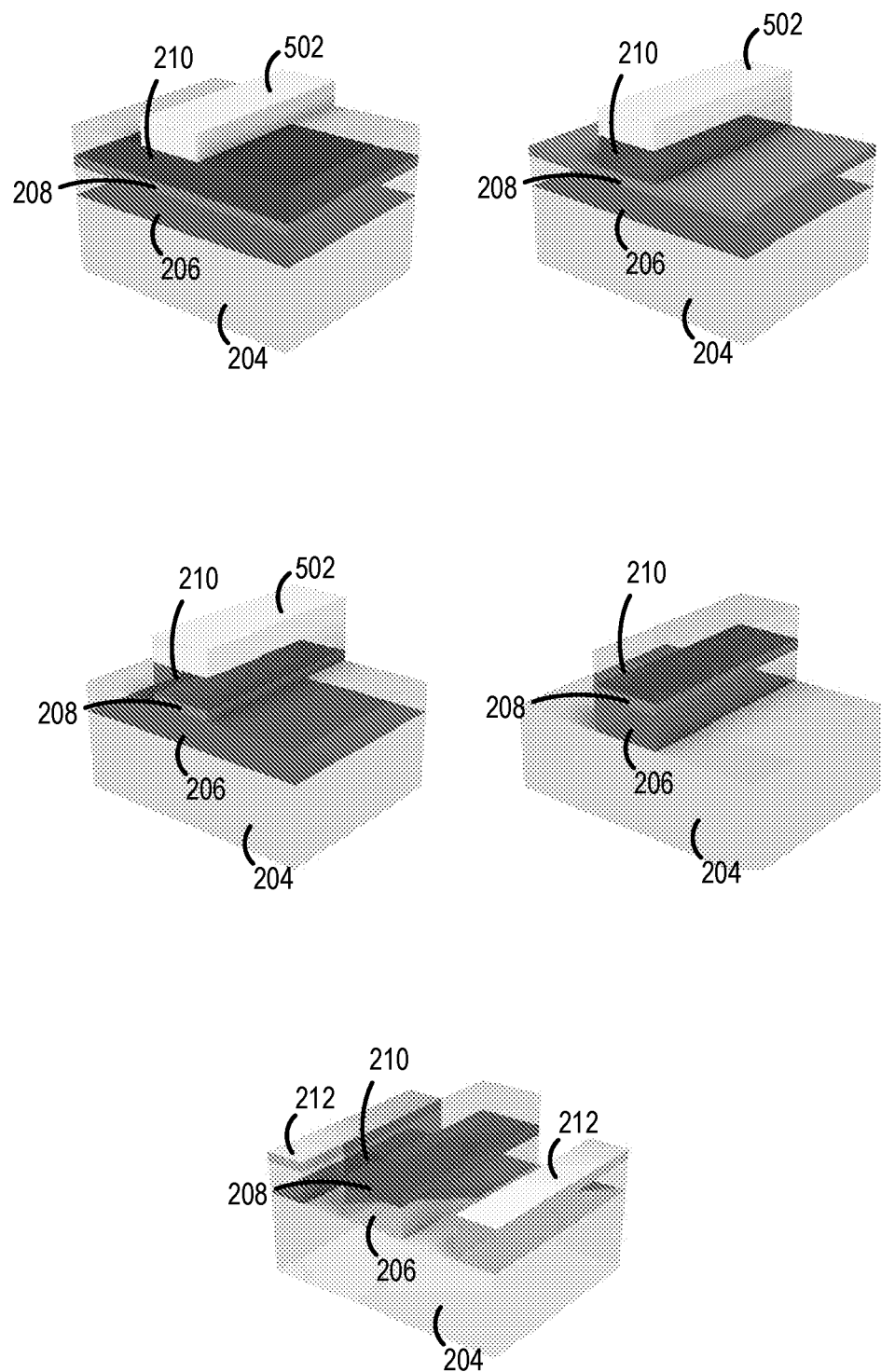
FIG. 5 is a perspective view of a method of fabrication of the heterogeneous waveguide of FIG. 2.

Referring now to FIG. 5, a method of fabricating the heterogeneous waveguide will now be described. The fabrication begins by growing a film of the first high index dielectric layer 206, then the low index dielectric layer 208 comprising the rare-earth dopants, then another high index dielectric layer 210 using molecular beam epitaxy (MBE). It is contemplated that one or more of the layers 206, 208, 210 could be grown using a method other than MBE. In some embodiments, the method of fabricating the heterogeneous waveguide may begin with a commercially-obtained silicon-on-insulator wafer, which can include the substrate 204. A mask layer of sputtered aluminum oxide is then grown on top of the layers 206, 208, 210 and patterned using electron beam lithography to form an aluminum oxide strip 502 which serves as a hard mask. The mask may be any suitable thickness, such as over 70 nanometers, or any other thickness between 30 and 300 nanometers. The part of the top high index dielectric layer 210 not covered by the aluminum oxide strip 502 is removed, such as with reactive ion etching using chlorine and oxygen or sulfur hexafluoride ($SF_6$) when the top high index dielectric layer 210 is silicon, resulting in the configuration shown in the top right of FIG. 5.

The mask layer could be a suitable material other than aluminum oxide and could be grown and/or patterned using suitable methods other than as shown herein. For example, in some embodiments, the mask layer may be aluminum nitride that may be applied by sputter or atomic layer deposition. In some embodiments, a layer of silicon dioxide may be applied on top of the aluminum nitride. The aluminum nitride (or aluminum nitride and silicon dioxide) can be patterned by applying a layer of hydrogen silsesquioxane (HSQ). The HSQ layer may be any suitable thickness, such as 370 nanometers. The HSQ layer is exposed with electron beam lithography and then an etching of chlorine and boron trichloride can be used to create the mask.

In the illustrative embodiment, the high index dielectric layer 210 is silicon, the etching process follows a series of steps. First, the sample is cleaned N-Methyl-2-pyrrolidone (NMP) for 10 minutes at 80 degrees Celsius and for one minute of sonication. The sample is rinsed with isopropyl alcohol and deionized water, then dried in nitrogen. Then an electron beam resist is applied, such as AR-6200.13. The resist is applied using spin coating, first by ramping up to 500 rotations per minute (RPM) at a rate of 100 RPM per second (RPM/s), spinning at 500 RPM for 10 seconds, then by ramping up to 4000 RPM at a rate of 2000 RPM/s, spinning at 4000 RPM for 45 seconds. This process leads to a resist thickness of 200 nanometers. The sample is baked at 30 degrees Celsius for one minute. A layer of gold is evaporated onto the sample at a rate of 1 angstrom per second until the layer of gold is 10 nanometers. The sample is then exposed to electron beam lithography at a dose of 350 microcoulombs per square centimeter. The silicon is then etched at 10 degrees Celsius with a gas flow rate for $SF_6$ of 14.8 standard cubit centimeters per second (sccm) and a gas flow rate for octafluorocyclobutane ($C_4F_8$) of 25.2 sccm. The etching is done at a pressure of 5 millitorr and a helium backside cooling pressure of 5 torr. The etching is done with an inductively coupled plasma (ICP) power of 600 Watts and a radiofrequency (RF) bias of 30 Watts. The sample then is cleaned in NMP for 10 minutes at 80 degrees Celsius, undergoes one minute of sonication, is rinsed with isopropyl alcohol and deionized water, and dried in nitrogen. The sample then undergoes oxygen plasma ashing at 200 degrees Celsius for 240 seconds.

Next, the etching is changed to remove the low index dielectric layer 208, such as by using argon (Ar) plasma or argon and nitrogen plasma to produce smooth vertical sidewalls when the low index dielectric layer 208 is $Y_2O_3$, resulting in the configuration shown in the middle left of FIG. 5. In the illustrative embodiment, the etching with argon is done with an argon flow of 40 standard cubic centimeters per minute (SCCM) at 5 millibar pressure with an inductively coupled plasma (ICP) power of 1,000 Watts and a radiofrequency (RF) bias of 100 Watts. Etching the $Y_2O_3$ layer 208 in this manner in the illustrative embodiment results in etching at a rate of 10 nm/min with surface roughness <2 nm RMS. The remaining high index dielectric layer 206 is then removed, such as with another $SF_6$ etch when the high index dielectric layer is silicon, resulting in the configuration shown in the middle right. The last step performs a second lithography for metallization for electrodes 212, resulting in the configuration shown in the bottom of FIG. 5.

It should be appreciated that, in some embodiments, the waveguide 202 may be formed by only etching the top high index layer 210 or by only etching the top high index layer 210 and the low index dielectric layer 208. For example, in one embodiment, a cavity may be formed from a waveguide without the bottom high index layer 206 being etched with a Q-factor greater than $10^6$ for wavelengths of 1,450-1,600 nanometers.

Figure 6:
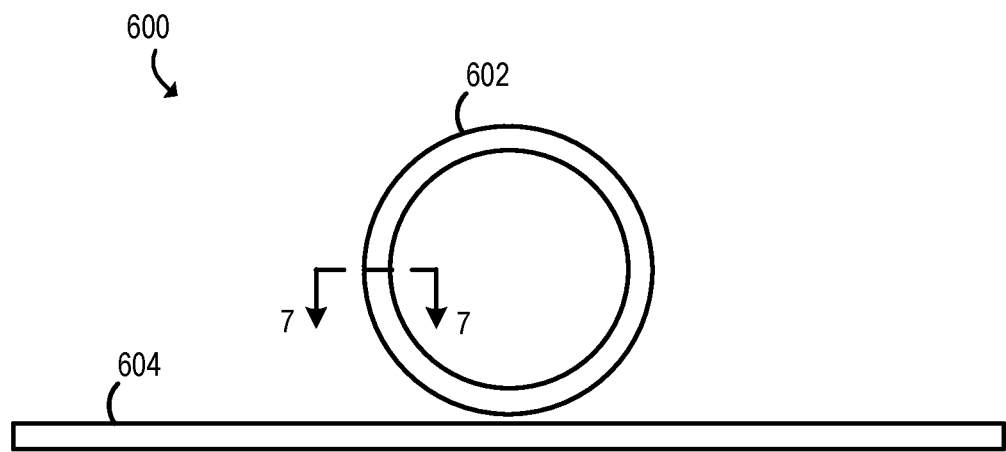
FIG. 6 is a top-down view of a microring resonator of one embodiment of the system of FIG. 1.
Figure 7:
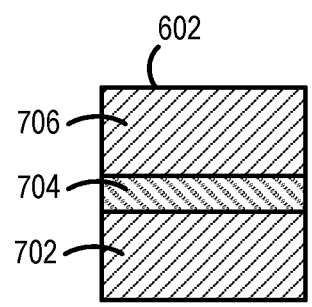
FIG. 7 is a cross-sectional view of the microring resonator of FIG. 6.

Referring now to FIG. 6, in some embodiments, the slot waveguide 202 can be configured as a ring resonator 602. The ring resonator 602 can be formed for example, by using a circular aluminum oxide strip 502, instead of the linear aluminum oxide strip 502 of FIG. 5, for patterning the layers as in FIG. 5. The resonator 602 could have a shape other than circular, for example, elliptical, race-track shaped etc. In the illustrated embodiment, the ring resonator 602 is a microring resonator 602 having an outer diameter smaller than 100 microns. As can be seen in FIG. 6, a microring resonator system 600 includes the microring resonator 602 and a coupling waveguide 604. In the illustrative embodiment, the microring resonator 602 is a slot waveguide with a first high index dielectric layer 702, a low index dielectric layer 704, and a second high index dielectric layer 706, as shown in FIG. 7. The structure and physical properties of the slot waveguide of the microring resonator may be similar to the slot waveguide 202, which will not be repeated herein in the interest of clarity. The coupling waveguide 604 may be, e.g., a silicon waveguide. In the illustrative embodiment, the coupling waveguide 604 sits on a substrate or insulator layer. Alternatively, in some embodiments, the coupling waveguide 604 may be suspended over a substrate or other layer and may by supported by one or more struts. Light may be coupled to the coupling waveguide 604 in any suitable manner, such as with a tapered waveguide or fiber, a suspended waveguide, a lensed fiber, etc. In some embodiments, the coupling waveguide 604 may have one or two tapered ends for coupled to other tapered waveguides, to tapered fibers, or to lensed fibers. In some embodiments, the coupling waveguide 604 may have a photonic crystal mirror reflecting light back out to the other end of the waveguide 604, which may be a tapered end coupled by a lensed or tapered fiber. The illustrative microring resonator may have an outer diameter of 50 micrometers, a Q-factor of $10^6$, and an erbium doping concentration of 10 ppm. The small mode volume and high Q-factor can enable a strong collective coupling to the dopants, allowing for a high-efficiency optical quantum memory.

It should be appreciated that, in some embodiments, the ring resonator 602 may be replaced by a microdisk. The modes supported by the microdisk may be whispering-gallery modes with a small mode volume. The edge of the microdisk may be suspended, with the microdisk supported by the substrate or other layer in the center of the microdisk.

Figure 10:
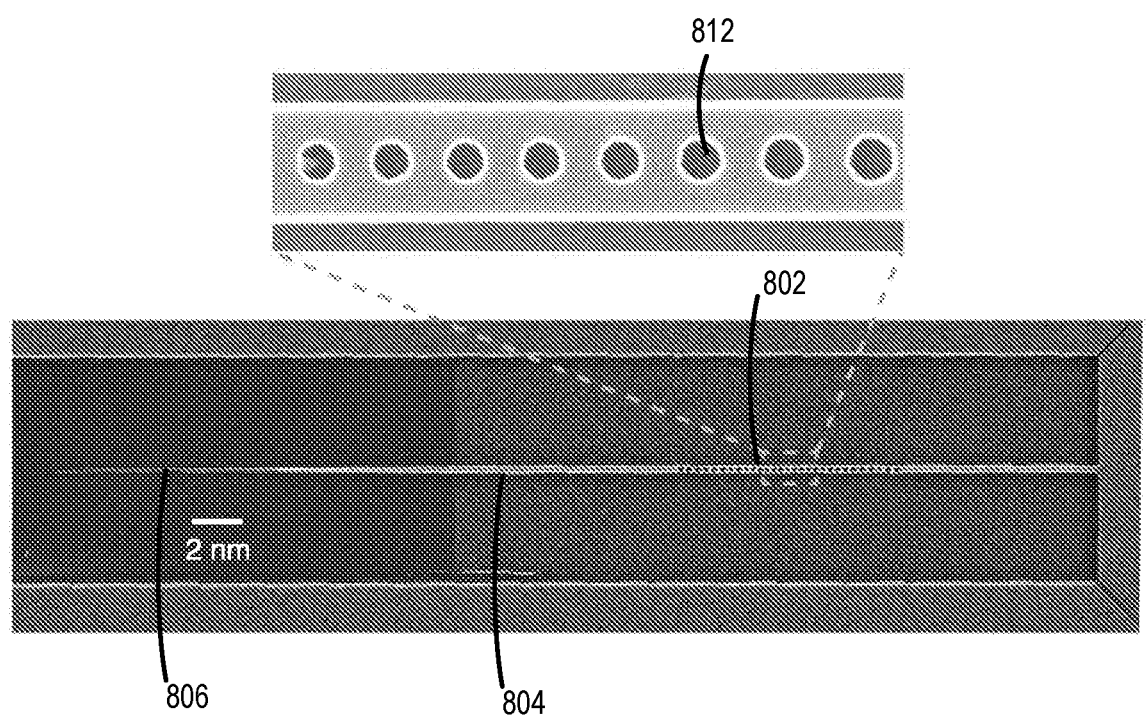
FIG. 10 is in an electron microscope picture of one embodiment of the photonic crystal heterogeneous waveguide of FIG. 8.

The ring resonator 602 and/or the microdisk may be coupled to waveguides and/or fibers in various configurations. For example, the ring resonator 602 and/or the microdisk may be coupled to one or more suspended waveguides that are each attached to the substrate with multiple struts. The coupling waveguide 604 may have one or two tapered ends and may be coupled to Referring now to FIG. 8, a photonic crystal slot waveguide system 800 includes a photonic crystal slot waveguide 802. The photonic crystal slot waveguide system 800 may be embodied as a slot waveguide similar to the slot waveguide 202 with features patterned into it, such as one or more holes 812. It should be appreciated that the holes 812 may act as a photonic crystal, confining light in a small volume of the photonic crystal slot waveguide 802. The photonic crystal slot waveguide 802 may be coupled on one side to a slot waveguide 804, which may in turn be coupled to a tapered waveguide 806 and a tapered fiber (not shown). A scanning electron microscope of one embodiment of the photonic crystal slot waveguide system 800 is shown in FIG. 10. In the illustrative embodiment, the mode volume can be as low as $V=0.04(\lambda/n_{Y_2O_3})^3$, where λ is the wavelength of the light and $n_{Y2O3}$ is the index of refractive of the $Y_2O_3$ layer. In some embodiments, the photonic crystal cavity can have different numbers of holes 810 on either side to match critical coupling conditions. Additionally or alternatively, in some embodiments, the photonic crystal cavity can have tapered input holes to reduce light scattering.

In the illustrated embodiment, the photonic crystal slot waveguide system 800 is supported by a substrate 808, such as silicon oxide. In the illustrated embodiment, the photonic crystal slot waveguide system 800 includes two electrodes 810 (similar to the proximity electrodes 212 discussed above), for applying a DC or AC electric field across the photonic crystal slot waveguide 802.

Application of an electric field across the electrodes 810 causes a linear Stark shift of transitions in dopants such as erbium in, e.g., $Y_2O_3$. The spectral shift of the dopants' optical transitions can be measured by spectral hole spectroscopy. To perform the measurement, a narrow spectral feature within the inhomogeneous width of the dopant is first created using spectral holeburning. This involves preparing a wide (tens of MHz) spectral pit, while leaving a small spectral section un-pumped. The resulting sharp feature can have a lifetime of, e.g., 8.5 ms for erbium, and a width as narrow as the homogeneous linewidth of the dopant (such as about 2 kHz for erbium at 1.5 K). For a DC field, a shift of the dopants' optical absorption line is directly measurable from the absorption spectrum.

Figure 11:
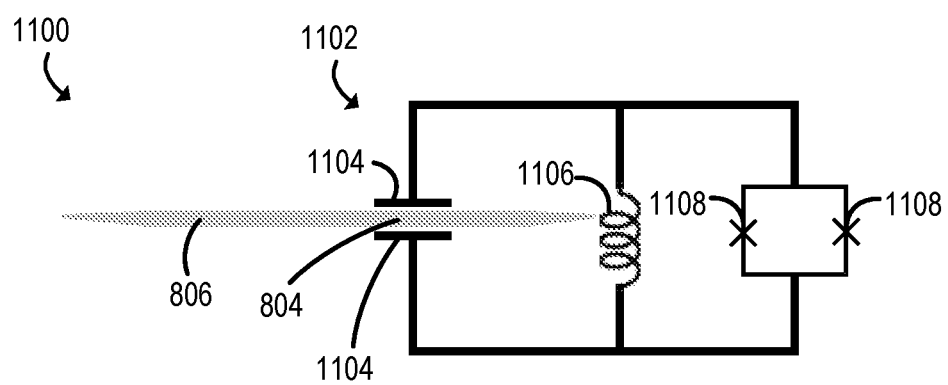
FIG. 11 is a simplified circuit diagram of an electro-optic transduction system of one embodiment of the system of FIG. 1.

Referring now to FIG. 11, in some embodiments, the photonic crystal waveguide 804 can be integrated into a superconducting microwave resonator 1102 to enhance the electric field strength. The superconducting microwave resonator 1102 may include a capacitor formed from two electrodes 1104 with the photonic crystal waveguide 804 in the middle, an inductor 1106, and, in some embodiments, one or more Josephson junctions 1108. For a high-impedance superconducting resonator at 5 GHz and a Q-factor of $10^6$, the peak field is about 0.01 V/cm with a single quanta excitation, which may allow for a single microwave photon to strongly interact with the dopants. In some embodiments, an ensemble of dopant ions can be probed, thus the collective coupling scales up from the single ion coupling by √N, where N is total number of ions in the interaction region.

In some embodiments, quantum coherence can be transferred from a microwave photon to an optical photon via electro-optic coupling. First, a sub-ensemble of ions, such as the narrow spectral formed by hole burning as described above, is excited by an optical pump of frequency $\omega_P$ that is detuned from the dopants' optical frequency by an amount equal to the frequency of microwave photons in the resonator, $\Delta=\omega_{MW}$. By populating the resonator, microwave cavity photons drive the quantum Stark interaction and are coherently up-converted to optical photons at an emission frequency of $\omega_P+\omega_{MW}$. The coherent emission can be coupled out of the waveguide 806 and detected through, e.g., beating with the optical pump to generate a heterodyne signal that is detectable by a photodiode. It should be appreciated that, by using spin states corresponding to an optically-excited level, spin noise is reduced, leading to improved performance of the system.

In some embodiments, a single microwave photon in the microwave resonator can be upconverted to an optical photon using the approach described above. In such embodiments, the superconducting microwave resonator 1102 may support a transmon qubit with use of the Josephson junctions 1108. It should be appreciated that this approach may allow for efficient transfer of a quantum state from a microwave photon to an optical photon.

In some embodiments, the doping of the photonic crystal waveguide 804 may be small enough that a transition of a single dopant can be identified. The coupling between the cavity and an excited state of the single dopant can be high, due to a small mode volume as low as $V=0.04(\lambda/n_{Y_2O_3})^3$ and a high Q-factor that can be over $10^6$. The precise energy of the transition can be controlled using a magnet to impose a Zeeman shift and a DC voltage to control a Start shift. With this approach, a pure single photon with high indistinguishability can be generated by exciting the single dopant and coupling it from the photonic crystal waveguide cavity to a tapered fiber. The single photon can be then be characterized, such as by performing a Hong-Ou-Mandel interference measurement with a similar source. In the disclosed embodiment, the indistinguishability of the photons can be over 99%.

It should be appreciated that, in some embodiments, the waveguide 202 shown in FIG. 2 may be used in place of the photonic crystal waveguide 804 for the electro-optic interactions described above. Advantages of using the waveguide 202 may include coupling to a larger number of dopants, lower optical loss, and a simpler system.

Figure 12:
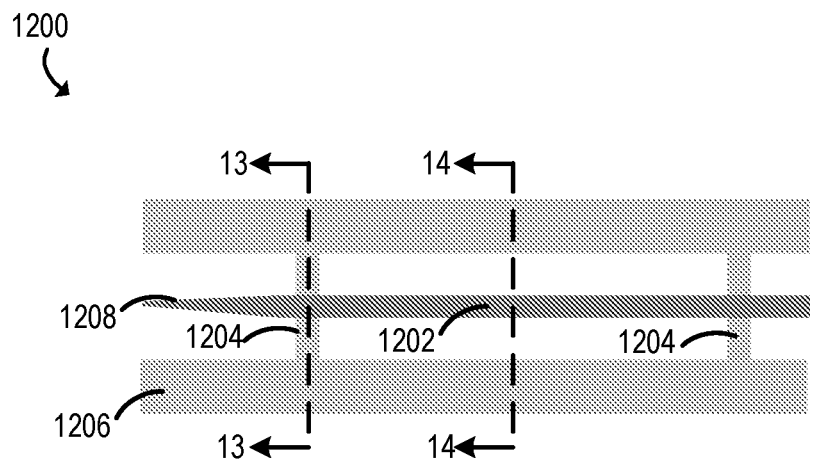
FIG. 12 is a top-down view of an acousto-optical transduction system.
Figure 13:
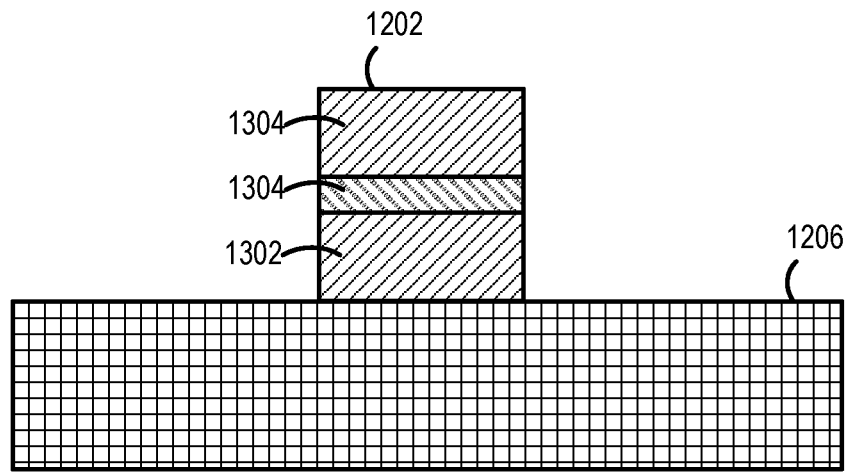
FIG. 13 is a cross-section view of a spoke region of a waveguide of the acousto-optical transduction system of FIG. 12.
Figure 14:
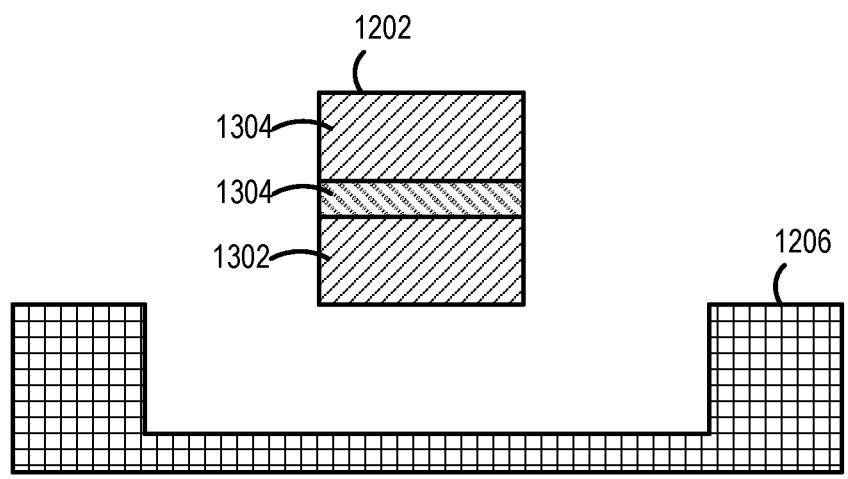
FIG. 14 is a cross-section view of a suspended region of the waveguide of the acousto-optical transduction system of FIG. 12.

Referring now to FIG. 12, an acousto-optical transduction system 1200 includes a heterostructure waveguide 1202 that is suspended from two or more supports 1204 extending upwards from the substrate 1206. To create the supports 1204, a heterostructure waveguide 1202 can be made in a similar manner as the heterostructure waveguide 202 discussed above, such as with the use of photolithography to define the undercut regions. In some embodiments, the waveguide 202 near the supports 1204 may be inverse tapered to prevent vibration and strain deformation. The substrate 1206 under the waveguide (except for the supports 1204) can be undercut using standard lithographic techniques. In some embodiments, the waveguide is suspended using vapor hydrofluoric acid etching or partially suspended using liquid hydrofluoric acid etching followed by critical point drying. In some embodiments, the waveguide 1202 has a tapered end 1208, which may be suspended. As shown in FIGS. 13 and 14, the heterostructure waveguide 1202 (made up of a first high index dielectric layer 1302, a low index dielectric layer 1304, and a second high index dielectric layer 1302) is supported by the substrate 1206 at certain locations and is suspended over the substrate 1206 at other locations.

In some embodiments, the waveguide

Figure 15:
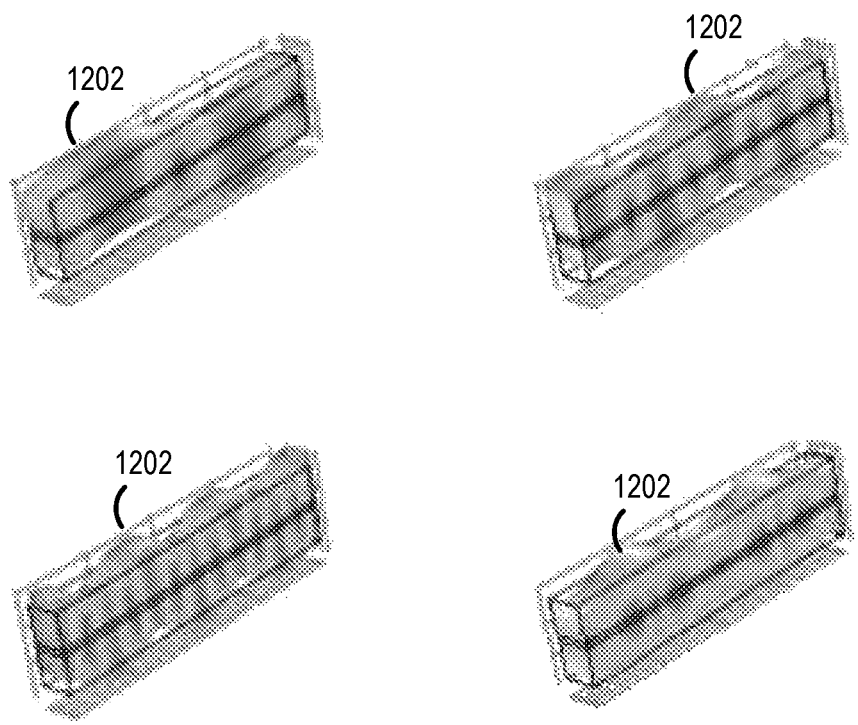
FIG. 15 is a simplified diagram showing several acoustic modes of the suspended region of the waveguide of the acousto-optical transduction system of FIG. 12.

Referring now to FIG. 15, as the region of the heterostructure waveguide 1202 that is suspended is not in physical contact with the substrate 1206, that region can support phonons travelling along the waveguide. Several of those modes are shown in FIG. 15, including both longitudinal and shear modes. The spectrum of phonon modes can be probed using stimulated Brillouin scattering by exciting the waveguide with co-propagating optical pump ($\omega_P$) and probe ($\omega_s$) lights that are offset in frequency by the frequency of the phonon mode being probed. The pump and probe frequencies are far detuned ($\gg$1 THz) from transitions of the dopant to avoid accidental optical excitation. In the illustrative embodiment of $Y_2O_3$ doped with erbium, the optical inhomogeneous linewidth of the target transition is 0.4 GHz and narrower than the phonon frequencies of 1.3-8.5 GHz. As a result, there will be sidebands of the target transition. These sidebands can be measured in optical absorption or photoluminescence spectrum, whose amplitudes reveal the acousto-optic coupling rate. In this way, ion-phonon interaction can be measured for each phononic mode. The ion-phonon coupling will follow $\sqrt{N}$ scaling, where N is the phonon mode occupation in the waveguide. The phonon occupancy can itself be measured by measuring the stimulated Brillouin scattering gain on the transmitted probe light. The single phonon coupling strength can then be inferred based on those measurements.

In some embodiments, the spin-phonon coupling in the dopants can be measured using Raman heterodyne measurements to detect an anti-crossing as the Zeeman spin transition is brought into resonance with the phonon frequency, resulting in Autler-Townes splitting. From the Autler-Townes splitting, the mechanical Rabi frequency can be determined. In some embodiments, the state of the phonons can be coherently mapped to the state of an optical field, allowing for a phonon-optical state transceiver. For example, in some embodiments, an photonic crystal waveguide structure may be formed that allows an optical field to be collocated with a phonon, leading to strong spin-phonon coupling of on the order of 1 kHz.

In some embodiments, the waveguides described above are coupled to one or more qubits for implementation as a qubit communication device or a qubit interconnect device. In some embodiments, the waveguides described above can be implemented as lasers; the concentration of rare earth dopants in the low-index dielectric layer being higher for implementation as a laser than for implementation a qubit coupling waveguide.

What is claimed is:

1. A heterogeneous waveguide comprising:
   a first layer of high index dielectric material disposed on top of a substrate;
   a second layer of low index dielectric material disposed on top of the first layer, wherein at least part of the second layer is doped with a rare earth dopant;
   a third layer of high index dielectric material disposed on top of the second layer, wherein an index of refraction of the first layer and the third layer is higher than an index of refraction of the second layer.

2. The heterogeneous waveguide of claim 1, wherein the second layer is an epitaxial layer.

3. The heterogeneous waveguide of claim 1, wherein each of the first, second, and third layer is an epitaxial layer.

4. The heterogeneous waveguide of claim 1, wherein the substrate is silicon oxide.

5. The heterogeneous waveguide of claim 1, wherein the concentration of the dopant is 0.1 to 100 parts per million.

6. The heterogeneous waveguide of claim 1, wherein the second layer is a rare earth oxide.

7. The heterogeneous waveguide of claim 1, wherein the second layer is yttrium oxide.

8. The heterogeneous waveguide of claim 1, wherein the second layer is yttrium orthosilicate.

9. The heterogeneous waveguide of claim 1, wherein the first layer is silicon.

10. The heterogeneous waveguide of claim 1, wherein the third layer is silicon.

11. The heterogeneous waveguide of claim 1, wherein the rare earth dopant is erbium.

12. The heterogeneous waveguide of claim 1, wherein the rare earth dopant is erbium, wherein the first layer is silicon, wherein the second layer is a rare earth oxide, wherein the third layer is silicon, wherein the dopant concentration is 0.1 to 100 parts per million.

13. The heterogeneous waveguide of claim 1, wherein the second layer is composed of (i) a first sublayer deposited on top of the first layer and being intentionally undoped, (ii) a second sublayer deposited on top of the first sublayer and having a desired doping concentration, and (iii) a third sublayer deposited on top of the second sublayer and being intentionally undoped.

14. The heterogeneous waveguide of claim 1, wherein the second layer is composed of (i) a first sublayer deposited on top of the first layer and with a doping concentration of the rare earth dopant less than 0.1 parts per million, (ii) a second sublayer deposited on top of the first sublayer and with a desired doping concentration of the rare earth dopant between 1 and 100 parts per million, and (iii) a third sublayer deposited on top of the second sublayer and with a doping concentration of the rare earth dopant less than 0.1 parts per million.

15. The heterogeneous waveguide of claim 1, wherein the heterogeneous waveguide comprises a first end and a second end, wherein each of the first end and the second end are tapered.

16. The heterogeneous waveguide of claim 1, wherein the heterogeneous waveguide is configured in a microdisk.

17. The heterogeneous waveguide of claim 1, further comprising:
   a slot waveguide formed by the first, second, and third layers;
   a first proximity electrode disposed on a first side of the heterogeneous waveguide; and
   a second proximity electrode disposed on a second side of the heterogeneous waveguide opposite the first.

18. A quantum transducer comprising the heterogeneous waveguide of claim 17, further comprising:
   a superconducting microwave resonator that comprises the first proximity electrode and the second proximity electrode, the superconducting microwave resonator further comprising one or more Josephson junctions configured to support a transmon qubit;
   electronic circuitry to control a state of the transmon qubit;
   a laser coupled to the heterogeneous waveguide, the laser configured to transfer the state of the transmon qubit to a state of the rare earth dopants doped in the second layer through upconversion.

19. The heterogeneous waveguide of claim 1, wherein the heterogeneous waveguide extends from a first position to a second position, wherein the heterogeneous waveguide is supported by the substrate at the first position and at the second position, wherein the heterogeneous waveguide is not supported by the substrate between the first position and the second position.

* * * * *